United States Patent
Ling et al.

(10) Patent No.: US 10,819,802 B2
(45) Date of Patent: Oct. 27, 2020

(54) ENABLING TRANSMISSION OF STREAMING CONTENT USING POINT TO MULTIPOINT DELIVERY

(71) Applicant: Telefonaktiebolaget LM Ericsson (publ), Stockholm (SE)

(72) Inventors: Jie Ling, Shanghai (CN); Michael John Slssingar, Hants (GB); Thorsten Lohmar, Aachen (DE); Haogang Xu, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/461,869

(22) PCT Filed: Jan. 31, 2017

(86) PCT No.: PCT/EP2017/052043
§ 371 (c)(1),
(2) Date: May 17, 2019

(87) PCT Pub. No.: WO2018/099612
PCT Pub. Date: Jun. 7, 2018

(65) Prior Publication Data
US 2019/0373064 A1    Dec. 5, 2019

(30) Foreign Application Priority Data

Nov. 29, 2016   (WO) ................ PCT/CN2016/107654

(51) Int. Cl.
*H04L 29/08*    (2006.01)
*H04W 4/06*    (2009.01)

(52) U.S. Cl.
CPC ............. *H04L 67/141* (2013.01); *H04W 4/06* (2013.01)

(58) Field of Classification Search
CPC ....... H04L 12/189; H04L 67/141; H04W 4/06
See application file for complete search history.

(56) References Cited

FOREIGN PATENT DOCUMENTS

| EP | 3 051 848 A2 | 8/2016 |
|----|--------------|--------|
| WO | WO 2016/123547 A1 | 8/2016 |
| WO | WO 2016/161655 A1 | 10/2016 |

OTHER PUBLICATIONS

International Search Report and Written Opinion of the International Searching Authority, PCT/EP2017/052043, dated Aug. 23, 2017, 14 pages.

*Primary Examiner* — Natasha W Cosme
(74) *Attorney, Agent, or Firm* — Sage Patent Group

(57) ABSTRACT

It is presented a method for enabling transmission of streaming content in a point to multipoint delivery. The method is performed in a radio network node of a cellular network. The method comprises the steps of: receiving a donor indication message from a wireless device in response to the wireless device receiving a donor command from an application server, the donor indication message indicating that the wireless device requests to be a donor device; setting up a point to multipoint delivery session; obtaining downlink data of streaming content destined for the donor device in a unicast delivery; transmitting the downlink data in a unicast delivery to the donor device; and transmitting a copy of the downlink data using the point to multipoint session, such that the downlink data can be received by a plurality of wireless devices being recipient devices.

12 Claims, 7 Drawing Sheets

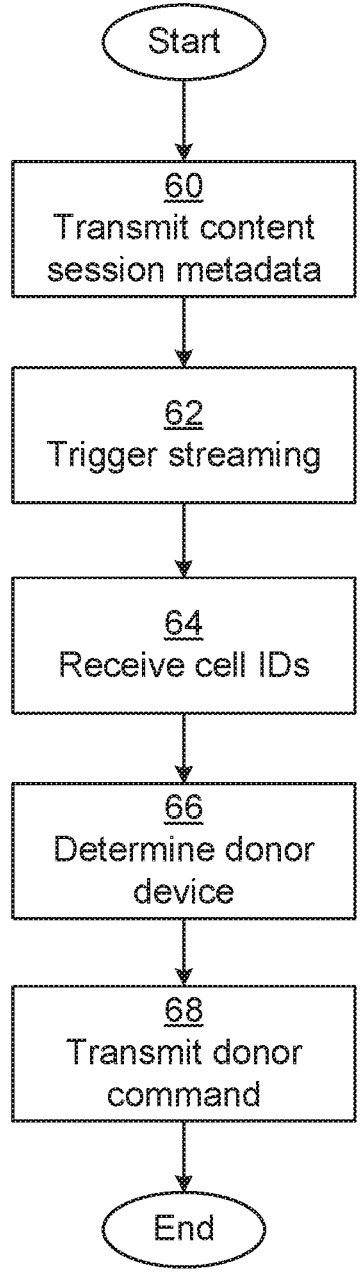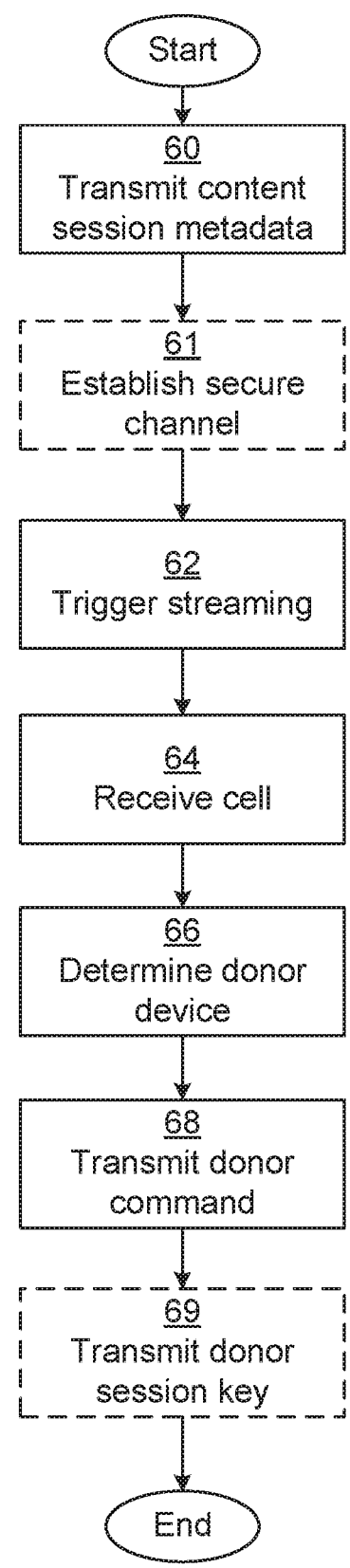
Fig. 6A
Fig. 6B

ENABLING TRANSMISSION OF STREAMING CONTENT USING POINT TO MULTIPOINT DELIVERY

This application is a 35 U.S.C. § 371 national stage application of PCT International Application No. PCT/EP2017/052043 filed on Jan. 31, 2017 as a continuation of International Patent Application No. PCT/CN2016/107654, filed on Nov. 29, 2016, the disclosures and content of which are incorporated by reference herein in their entirety.

TECHNICAL FIELD

The invention relates to methods, radio network nodes, wireless devices, application servers, computer programs and computer program products for enabling transmission of streaming content in a point to multipoint delivery.

BACKGROUND

Streaming content is constantly increasing in popularity. However, bandwidth requirements for streaming content puts great pressure on the infrastructure between the content server and the streaming receiver, such as a wireless device.

Unicast is when there is a separate stream for each wireless device. While this solution is flexible, this implies that resource usage is extensive, since resources for separate streams need to be provided for each wireless device.

Point to multipoint delivery solutions, such as broadcasting and multicasting, can be used to increase efficiency, since at least some resources can be shared for delivery to several wireless devices. eMBMS (evolved Multimedia Broadcast Multicast Service), specified by 3GPP, is one way to provide point to multipoint delivery. Such point to multipoint solutions can be particularly useful for live events, when multiple users want to receive the same content concurrently. While eMBMS and other solutions do achieve increased resource efficiency, the content providers need to configure the system for each content delivery session, putting a significant burden on the content providers.

SUMMARY

It is an object to provide efficient content delivery, such as for point to multipoint, but with a reduced amount of configuration needed.

According to a first aspect, it is presented a method for enabling transmission of streaming content in a point to multipoint delivery. The method is performed in a radio network node of a cellular network. The method comprises the steps of: receiving a donor indication message from a wireless device in response to the wireless device receiving a donor command from an application server, the donor indication message indicating that the wireless device requests to be a donor device; setting up a point to multipoint delivery session; obtaining downlink data of streaming content destined for the donor device in a unicast delivery; transmitting the downlink data in a unicast delivery to the donor device; and transmitting a copy of the downlink data using the point to multipoint session, such that the downlink data can be received by a plurality of wireless devices being recipient devices.

The multipoint delivery may be based on Single Cell Point to Multipoint, SC-PTM.

The unicast delivery and the multipoint delivery may be sent in the same radio cell.

The step of obtaining the downlink data may comprise obtaining the downlink data as User Datagram Protocol, UDP, packets and the step of transmitting a copy of the downlink data may comprise transmitting the downlink data comprising the UDP packets.

The step of obtaining the downlink data may comprise obtaining the downlink data as User Datagram Protocol, UDP, packets and the step of transmitting a copy of the downlink data may comprise modifying the destination address in a header of each Internet Protocol, IP, packet containing a UDP packet, prior to transmitting the downlink data.

According to a second aspect, it is presented a radio network node configured to form part of a cellular network for enabling transmission of streaming content in a point to multipoint delivery. The radio network node comprises: a processor; and a memory storing instructions that, when executed by the processor, cause the radio network node to: receive a donor indication message from a wireless device in response to the wireless device receiving a donor command from an application server, the donor indication message indicating that the wireless device requests to be a donor device; set up a point to multipoint delivery session; obtain downlink data of streaming content destined for the donor device in a unicast delivery; transmit the downlink data in a unicast delivery to the donor device; and transmit a copy of the downlink data using the point to multipoint session, such that the downlink data can be received by a plurality of wireless devices being recipient devices.

The multipoint delivery may be based on Single Cell Point to Multipoint, SC-PTM.

The unicast delivery and the multipoint delivery may be sent in the same radio cell.

The instructions to obtain the downlink data may comprise instructions that, when executed by the processor, cause the radio network node to obtain the downlink data as User Datagram Protocol, UDP, packets and the instructions to transmit a copy of the downlink data may comprise instructions that, when executed by the processor, cause the radio network node to transmit the downlink data comprising the UDP packets.

The instructions to obtain the downlink data may comprise instructions that, when executed by the processor, cause the radio network node to obtain the downlink data as User Datagram Protocol, UDP, packets and the instructions to transmit a copy of the downlink data may comprise instructions that, when executed by the processor, cause the radio network node to modify the destination address in a header of each Internet Protocol, IP, packet containing a UDP packet, prior to transmitting the downlink data.

According to a third aspect, it is presented a radio network node comprising: means for receiving donor indication message from a wireless device in response to the wireless device receiving a donor command from an application server, the donor indication message indicating that the wireless device requests to be a donor device; means for setting up a point to multipoint delivery session; means for obtaining downlink data of streaming content destined for the donor device in a unicast delivery; means for transmitting the downlink data in a unicast delivery to the donor device; and means for transmitting a copy of the downlink data using the point to multipoint session, such that the downlink data can be received by a plurality of wireless devices being recipient devices.

According to a fourth aspect, it is presented a computer program for enabling transmission of streaming content in a point to multipoint delivery. The computer program comprises computer program code which, when run on a radio network node of a cellular network causes the radio network node to: receive a donor indication message from a wireless device in response to the wireless device receiving a donor command from an application server, the donor indication message indicating that the wireless device requests to be a donor device; set up a point to multipoint delivery session; obtain downlink data of streaming content destined for the donor device in a unicast delivery; transmit the downlink data in a unicast delivery to the donor device; and transmit a copy of the downlink data using the point to multipoint session, such that the downlink data can be received by a plurality of wireless devices being recipient devices.

According to a fifth aspect, it is presented a computer program product comprising a computer program according to the fourth aspect and a computer readable means on which the computer program is stored.

According to a sixth aspect, it is presented a method for enabling transmission of streaming content in a point to multipoint delivery. The method is performed in a wireless device of a cellular network also comprising a radio network node. The method comprises the steps of: receiving content session metadata from an application server associated with a content server; transmitting a message to an application server associated with the content provider, the message comprising an identifier of a current cell of the wireless device; receiving streaming content from the content server over unicast; receiving a donor command from the application server, the donor command requesting the wireless device to be a donor device, such that the streaming content should be a source for streaming content for other wireless devices; and transmitting a donor indication message to a radio network node to request to be a donor device.

The method may further comprise the step of: establishing a secure channel with the application server; and wherein the step of receiving streaming content comprises receiving the streaming content over the secure channel.

According to a seventh aspect, it is presented a wireless device configured to form part of a cellular network for enabling transmission of streaming content in a point to multipoint delivery in the cellular network also comprising a radio network node. The wireless device comprises: a processor;

and a memory storing instructions that, when executed by the processor, cause the wireless device to: receive content session metadata from an application server associated with a content server; transmit a message to an application server associated with the content provider, the message comprising an identifier of a current cell of the wireless device; receive streaming content from the content server over unicast; receive a donor command from the application server, the donor command requesting the wireless device to be a donor device, such that the streaming content should be a source for streaming content for other wireless devices; and transmit a donor indication message to a radio network node to request to be a donor device.

The wireless device may further comprise instructions that, when executed by the processor, cause the wireless device to establish a secure channel with the application server; in which case the instructions to receive streaming content comprise instructions that, when executed by the processor, cause the wireless device to receive the streaming content over the secure channel.

According to an eighth aspect it is presented a wireless device comprising: means for receiving content session metadata from an application server associated with a content server; means for transmitting a message to an application server associated with the content provider, the message comprising an identifier of a current cell of the wireless device, the wireless device being of a cellular network also comprising a radio network node; means for receiving streaming content from the content server over unicast; means for receiving a donor command from the application server, the donor command requesting the wireless device to be a donor device, such that the streaming content should be a source for streaming content for other wireless devices; and means for transmitting a donor indication message to a radio network node to request to be a donor device.

According to a ninth aspect, it is presented a computer program for enabling transmission of streaming content in a point to multipoint delivery. The computer program comprises computer program code which, when run on a wireless device of a cellular network also comprising a radio network node causes the wireless device to: receive content session metadata from an application server associated with a content server; transmit a message to an application server associated with the content provider, the message comprising an identifier of a current cell of the wireless device; receive streaming content from the content server over unicast; receive a donor command from the application server, the donor command requesting the wireless device to be a donor device, such that the streaming content should be a source for streaming content for other wireless devices; and transmit a donor indication message to a radio network node to request to be a donor device.

According to a tenth aspect, it is presented a computer program product comprising a computer program according to the ninth aspect and a computer readable means on which the computer program is stored.

According to an eleventh aspect, it is presented a method for enabling transmission of streaming content in a point to multipoint delivery. The method is performed in an application server associated with a content server. The method comprises the steps of: transmitting content session metadata to a plurality of wireless devices; triggering streaming of content from the content server over unicast to each one of the plurality of wireless devices; receiving a message from each one of the plurality of wireless devices, the message comprising an identifier of a current cell of the respective wireless devices; determining one of the plurality of wireless devices to be a donor device, such that the streaming content for the donor device should be a source for streaming content for the at least one other wireless device wherein the donor device is in a cell where there is at least one other wireless device; and transmitting a donor command to the donor device, the donor command requesting the wireless device to be the donor device.

The step of determining one of the plurality of wireless devices to be a donor device may comprise determining a wireless device which is preconfigured to be a donor device, to be the donor device.

The step of determining one of the plurality of wireless devices to be a donor device may comprise determining a wireless device to be a donor device based on predicted movement of the wireless device.

The method may further comprise the step of: establishing a secure channel with each one of the plurality of wireless devices, yielding a respective session key; in which case the step of triggering streaming of content comprises providing the session keys to the content server such that the streaming of content occurs using the respective session key. The method then further comprises the step of: transmitting the session key associated with the donor device to each one of the at least one other wireless device using the respective secure channel.

According to a twelfth aspect, it is presented an application server configured to be associated with a content server for enabling transmission of streaming content in a point to multipoint delivery. The application server comprises: a processor; and a memory storing instructions that, when executed by the processor, cause the application server to: transmit content session metadata to a plurality of wireless devices; trigger streaming of content from the content server over unicast to each one of the plurality of wireless devices;

receive a message from each one of the plurality of wireless devices, the message comprising an identifier of a current cell of the respective wireless devices; determine one of the plurality of wireless devices to be a donor device, such that the streaming content for the donor device should be a source for streaming content for the at least one other wireless device wherein the donor device is in a cell where there is at least one other wireless device; and transmit a donor command to the donor device, the donor command requesting the wireless device to be the donor device.

The instructions to determine one of the plurality of wireless devices to be a donor device may comprise instructions that, when executed by the processor, cause the application server to determine a wireless device which is pre-configured to be a donor device, to be the donor device.

The instructions to determine one of the plurality of wireless devices to be a donor device may comprise instructions that, when executed by the processor, cause the application server to determine a wireless device to be a donor device based on predicted movement of the wireless device.

The application server may further comprise instructions that, when executed by the processor, cause the application server to: establish a secure channel with each one of the plurality of wireless devices, yielding a respective session key; in which case the instructions to trigger streaming of content comprise instructions that, when executed by the processor, cause the application server to provide the session keys to the content server such that the streaming of content occurs using the respective session key. The application server then further comprises instructions that, when executed by the processor, cause the application server to: transmit the session key associated with the donor device to each one of the at least one other wireless device using the respective secure channel.

According to a thirteenth aspect, it is presented an application server comprising: means for transmitting content session metadata to a plurality of wireless devices; means for triggering streaming of content from a content server, associated with the application server, over unicast to each one of the plurality of wireless devices; means for receiving a message from each one of the plurality of wireless devices, the message comprising an identifier of a current cell of the respective wireless devices; means for determining one of the plurality of wireless devices to be a donor device, such that the streaming content for the donor device should be a source for streaming content for the at least one other wireless device wherein the donor device is in a cell where there is at least one other wireless device; and means for transmitting a donor command to the donor device, the donor command requesting the wireless device to be the donor device.

According to a fourteenth aspect, it is presented a computer program for enabling transmission of streaming content in a point to multipoint delivery. The computer program comprises computer program code which, when run on an application server associated with a content server, causes the application server to: a processor; and a memory storing instructions that, when executed by the processor, cause the application server to: transmit content session metadata to a plurality of wireless devices; trigger streaming of content from the content server over unicast to each one of the plurality of wireless devices; receive a message from each one of the plurality of wireless devices, the message comprising an identifier of a current cell of the respective wireless devices; determine one of the plurality of wireless devices to be a donor device, such that the streaming content for the donor device should be a source for streaming content for the at least one other wireless device wherein the donor device is in a cell where there is at least one other wireless device; and transmit a donor command to the donor device, the donor command requesting the wireless device to be the donor device.

According to a fifteenth aspect, it is presented a computer program product comprising a computer program according to the fourteenth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 6A-B are flow charts illustrating embodiments of methods for enabling transmission of streaming content in a point to multipoint delivery, performed in an application server;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
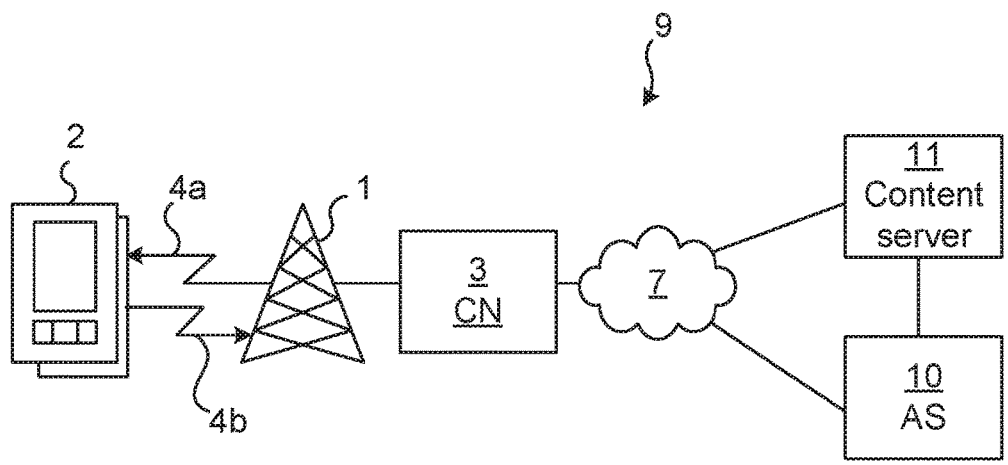
FIG. 1 is a schematic diagram illustrating a cellular communication network where embodiments presented herein may be applied.

FIG. 1 is a schematic diagram illustrating a cellular communication network 9 where embodiments presented herein may be applied. The cellular communication network 8 comprises a core network 3 and one or more radio network nodes 1, here in the form of radio base stations being evolved Node Bs, also known as eNode Bs or eNBs. The radio network node 1 could also be in the form of Node Bs, BTSs (Base Transceiver Stations) and/or BSSs (Base Station Subsystems), etc. The radio network node 1 provides radio connectivity over a wireless interface 4a-b to a plurality of wireless devices 2.

The term wireless device is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless device 2 can comprise a number of wires for internal and/or external purposes.

The cellular communication network 8 may e.g. comply with any one or a combination of 5G (fifth generation networks), LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Over the wireless interface, downlink (DL) communication 4a occurs from the radio network node 1 to the wireless device 2 and uplink (UL) communication 4b occurs from the wireless device 2 to the radio network node 1. The quality of the wireless radio interface to each wireless device 2 can vary over time and depending on the position of the wireless device 2, due to effects such as fading, multipath propagation, interference, etc.

The radio network node 1 is also connected to the core network 3 for connectivity to central functions and a wide area network 7, such as the Internet.

Also connected to the wide area network 7 is a content server 11 and an application server 10, both of a content provider. The content server 11 is used to provide streaming content to the wireless device 2. The streaming content can be streaming video and/or streaming audio. The content delivered from the content server 11 can be delivered to the wireless devices 2 by nodes downstream in the network using both unicast and point to multipoint delivery. For instance, the point to multipoint delivery is based on Single Cell Point to Multipoint, SC-PTM but may also utilise MBSFN (Multimedia Broadcast Single Frequency Network). The delivery can e.g. be implemented using DASH (Dynamic Adaptive Streaming over HTTP) over HTTP/2, HTTP or QUIC (Quick UDP (User Datagram Protocol) Internet Connections). It is to be noted that more sets of content servers 11 and respective application server 10 can be provided for more content providers.

The application server 10 is associated with the content server 11 and is used by the content provider to control the delivery of content. Specifically, as explained in more detail below, the application server controls one of the wireless devices in a cell to be a so called donor device. This implies that content streamed to the donor device using unicast is also transmitted to other wireless devices using point to multipoint delivery to be more efficient in resource usage. In other words, the content for donor device is used also for other devices, whereby the term donor is used. It is to be noted that cells should be interpreted as any area controlled by a radio control function.

Figure 2:
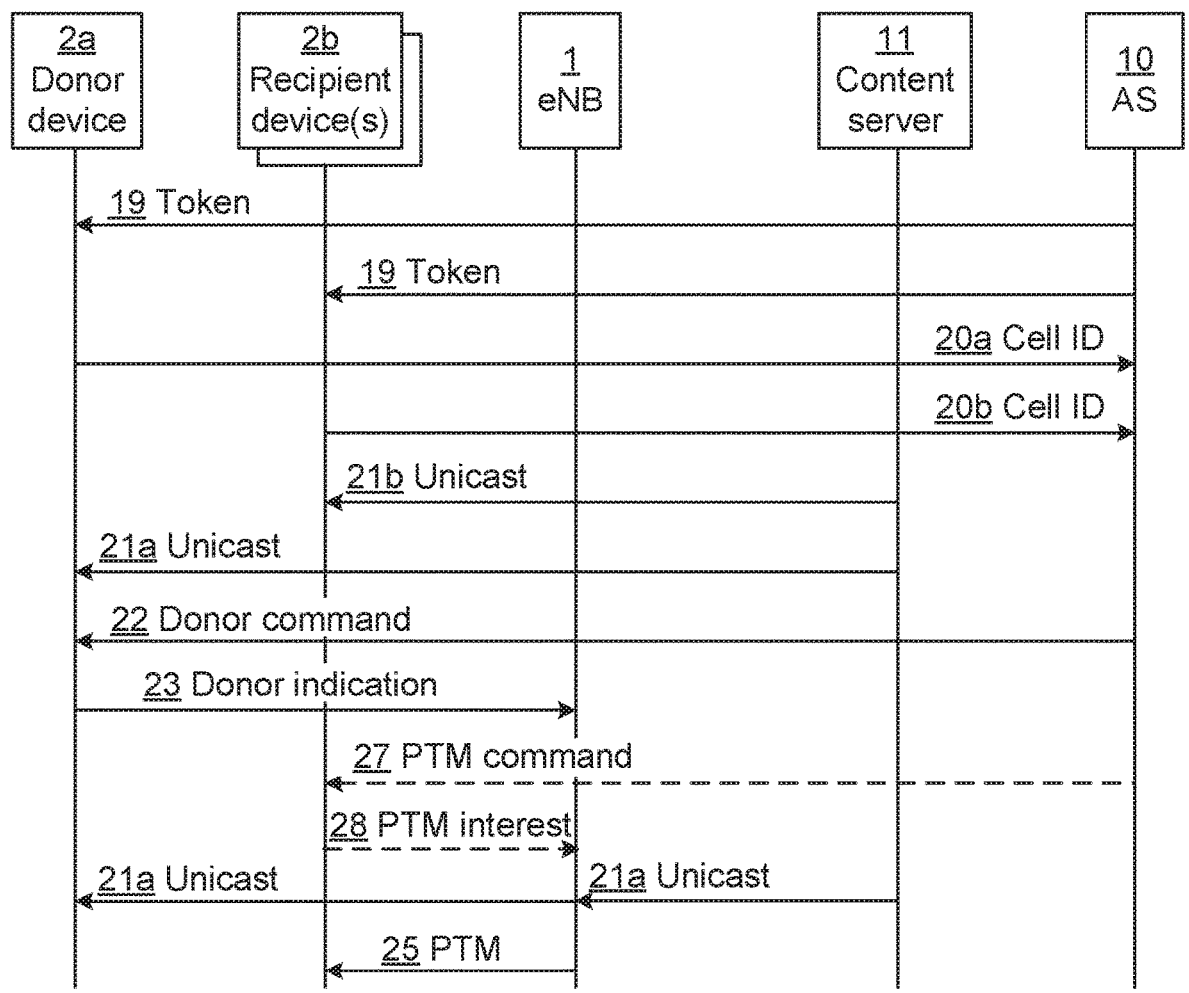
FIG. 2 is a sequence diagram illustrating communication between some of the devices of FIG. 1 to enable transmission of streaming content in a point to multipoint delivery.

FIG. 2 is a sequence diagram illustrating communication between some of the devices of FIG. 1 to enable transmission of streaming content in a point to multipoint delivery. The wireless devices are here split up into one donor device 2a and one or more recipient devices 2b. The functionality provided by the wireless devices 2a-b can be performed by the respective wireless device executing software in the form of an app (also known as application). The app can be provided by the content provider which controls the content server 11 and the application server 10. It should be noted that wireless devices can shift roles over time; a wireless device that is a donor device for one content session can be a recipient device for another content session and vice versa.

The application server 10 transmits a token 19 to what is later going to be the donor device 2a. Also, the application server 10 transmits a corresponding token 19 to each one of the what is later going to be recipient devices 2b. It is to be noted that there does not need to be any difference between what is going to be the donor device 2a and what is going to be the recipient device(s) 2b at this stage. They may all function identically at this stage and only once the application server 10 determines which device is to be the donor device 2a, are the roles separated. Also, a wireless device which assumes the role of donor device 2a in this session may assume the role of recipient device in another session 2b, and vice versa.

The tokens 19 are specific to a certain piece of content. The application server 10 predicts a consumption trend of the content using cell id and consumed content previously reported from the app executing in wireless devices. Hence, the tokens 19 are not needed for the prediction of consumption. Instead, the token can be used by the radio network node 1 to determine when multiple wireless devices in the cell are interested in the same content, represented by respective tokens. Also, the radio network node 1 uses the token in a hash process to obtain a TMGI (Temporary Mobile Group Identifier), as explained below.

Figure 3:
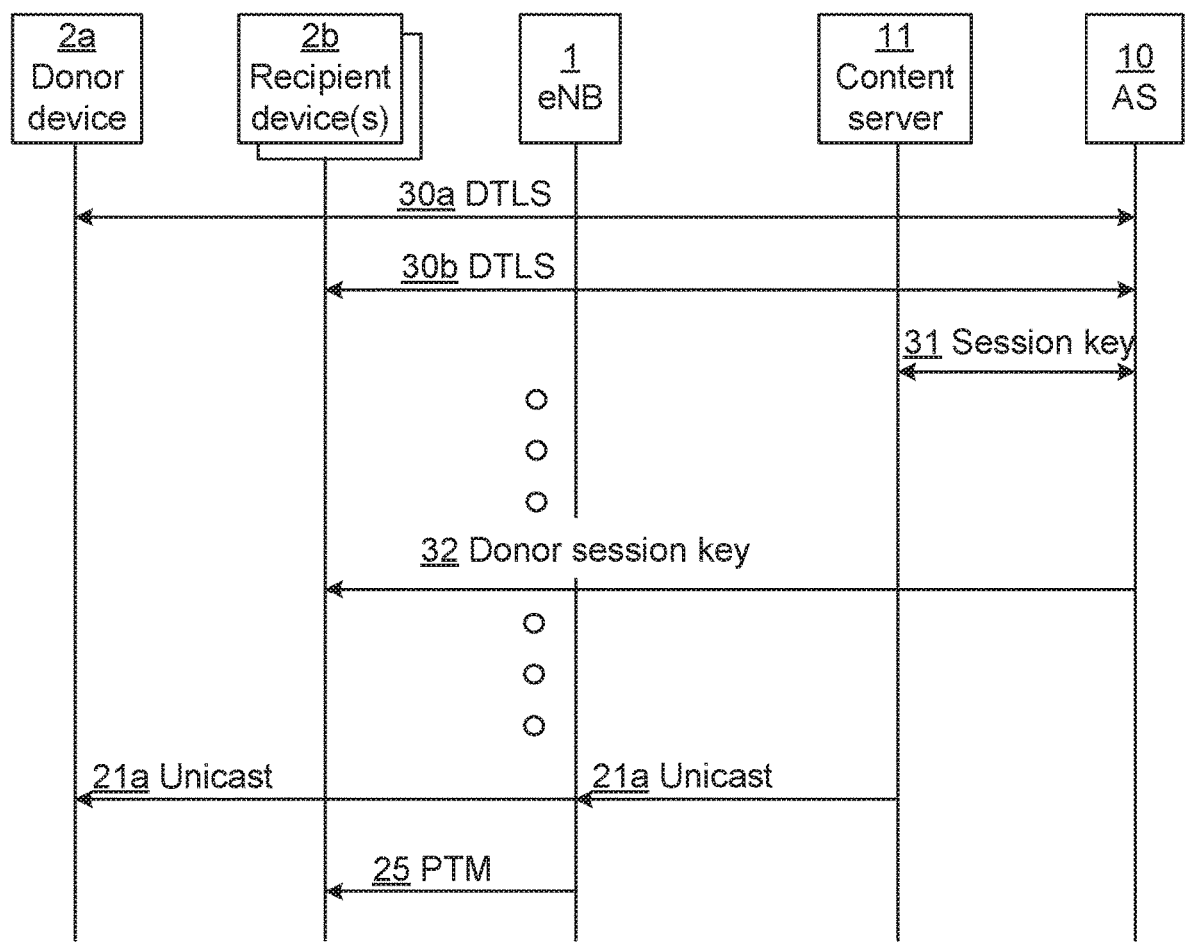
FIG. 3 is a sequence diagram illustrating additional communication between some of the devices of FIG. 1 to allow encrypted content.

The tokens 19 comprise an identifier of the content session in question and can contain additional metadata as described in more detail below. The tokens 19 are optionally encrypted, e.g. using DTLS (Datagram Transport Layer Security) using a session key established as illustrated in FIG. 3 and described below. The donor device 2a responds with a cell id message 20a, comprising an identifier of a current cell of the donor device. Analogously, the recipient devices 2b respond with a cell id message 20b, comprising an identifier of a current cell of each one the recipient devices. The token is entirely under the control of the content provider and is not provided or modified by the network operator.

At some point, the content server starts transmitting unicast content 21*b* to the donor device 2*a* and unicast content 21*b* to the recipient device(s) 2*b*.

The application server 10 determines that the donor device 2*a* is in the same cell as the recipient device(s) 2*b*, opening up the opportunity of using one unicast content delivery as donor content for a point to multipoint delivery. This opens up the opportunity for better radio resource usage since point to multipoint delivery is more efficient than unicast when several devices receive the same content. In other words, there needs to be (or predicted to be) a number of devices greater than a threshold number, optionally for longer than a threshold time, that consumes the same content in order for the point to multipoint delivery to make sense. When this is the case, the application server 10 sends a donor command 22 to the donor device 2*a*. This indicates to the donor device 2*a* that it is indeed to assume the role of the donor device. The donor command can include metadata that the donor device 2*a* may need itself or that it needs to include in a later donor indication 23 to the radio network node 1. As explained below with reference to FIG. 6A, the donor device can be a dedicated device provided by the content provided. Alternatively, the donor device can be any of the wireless devices in the cell which consumes the content in question. The donor device can then be selected at random or based on certain criteria, e.g. a device which moves slower than the rest, or is even stationary, and/or which is located more towards the centre of the cell than the rest. In such a case, there is less risk that the appointed donor device moves outside the cell.

As a consequence of the donor command 22, the donor device 2*a* transmits a donor indication 23 to the radio network node 1. The donor indication 23 can be transmitted over the RLC (Radio Link Control) layer to the radio network node. The donor indication 23 can include metadata such as the token 19 indicating the identity of the content session, the number of wireless devices consuming the content (metadata which has been retrieved from the donor command), content data radio bearer ID, Quality of Service (QoS) parameters, session duration, etc. The donor indication thus indicates that the donor device 2*a* accepts to be a donor in this session.

Optionally, the application server 10 instructs the recipient devices 2*b*, in a PTM (Point To Multipoint) command 27, to send a PTM (point to multipoint) interest indications 28 to the radio network node 1, wherein the interest indication includes the token 19 identifying the content. This will help the radio network node to make sure the content is indeed of interest to multiple recipient devices 2*b*.

After this, the radio network node 1 sets up a point to multipoint delivery session to be used by the recipient devices. Since SC-MTCH requires G-RNTI (Group Radio Network Temporary Identifier) and TMGI, a mapping algorithm is optionally applied to the PTM interest indication token to derive a unique 3GPP compliant TMGI based on the token. This enables wireless devices to calculate a TMGI value for any given content session, indicated by a token.

When new unicast content 21*a* is received from the content server 11, the radio network node 1 then, on one hand, transmits the unicast content 21*a* to the donor device 2*a*, and, on the other hand, transmits a copy of the unicast content in a point to multipoint delivery 25 to the recipient devices 2*b*.

The recipient devices 2*b* receive metadata about the point to multipoint e.g. in a SIB (system information block) and SC-MCCH (single-cell multicast control channel) from the radio network node. The identification of relevant metadata can be done using the TMGI, which can be mapped from the token in each device in correspondence with how the TMGI is derived in the radio network node 1. Once all the metadata has been received, each recipient device stops receiving content through its unicast session and receives the content instead using the point to multipoint delivery 25.

If a donor device moves out of the cell or drops its connection, all recipient devices fall back to unicast sessions first. At this point, a new donor device can be appointed by the application server, from the remaining recipient devices, after which recipient devices can again receive the content using point to multipoint delivery.

FIG. 3 is a sequence diagram illustrating additional communication between some of the devices of FIG. 1 to allow encrypted content. It is to be noted that the sequence of FIG. 3 is optional, since the content may in many cases not be needed to be encrypted.

The application server 10 and the donor device 2*a* here establish a secure channel 30*a*, such as DTLS, as known in the art per se. Analogously, the application server 10 and each one of the recipient devices 2*b* establish respective secure channels 30*b*. The application server 10 communicates the session keys 31 of the secure channels 30*a-b* to the content server 11 to allow the content to be encrypted for each unicast session using the session key for the respective secure channel. After this, messages 19-21 from FIG. 2 are performed.

Once the application server 10 has determined a device to be the donor device 2*a*, the application server 10 sends the session key 32 for the donor device 2*a* to the recipient device(s) 2*b*. The rest of the sequence is the same as for FIG. 2, with the distinction that the recipient device(s) 2*b* also now have the donor session key. This allows the recipient device(s) 2*b* to decrypt the content data originally intended for the donor device 2*a*.

Figure 4:
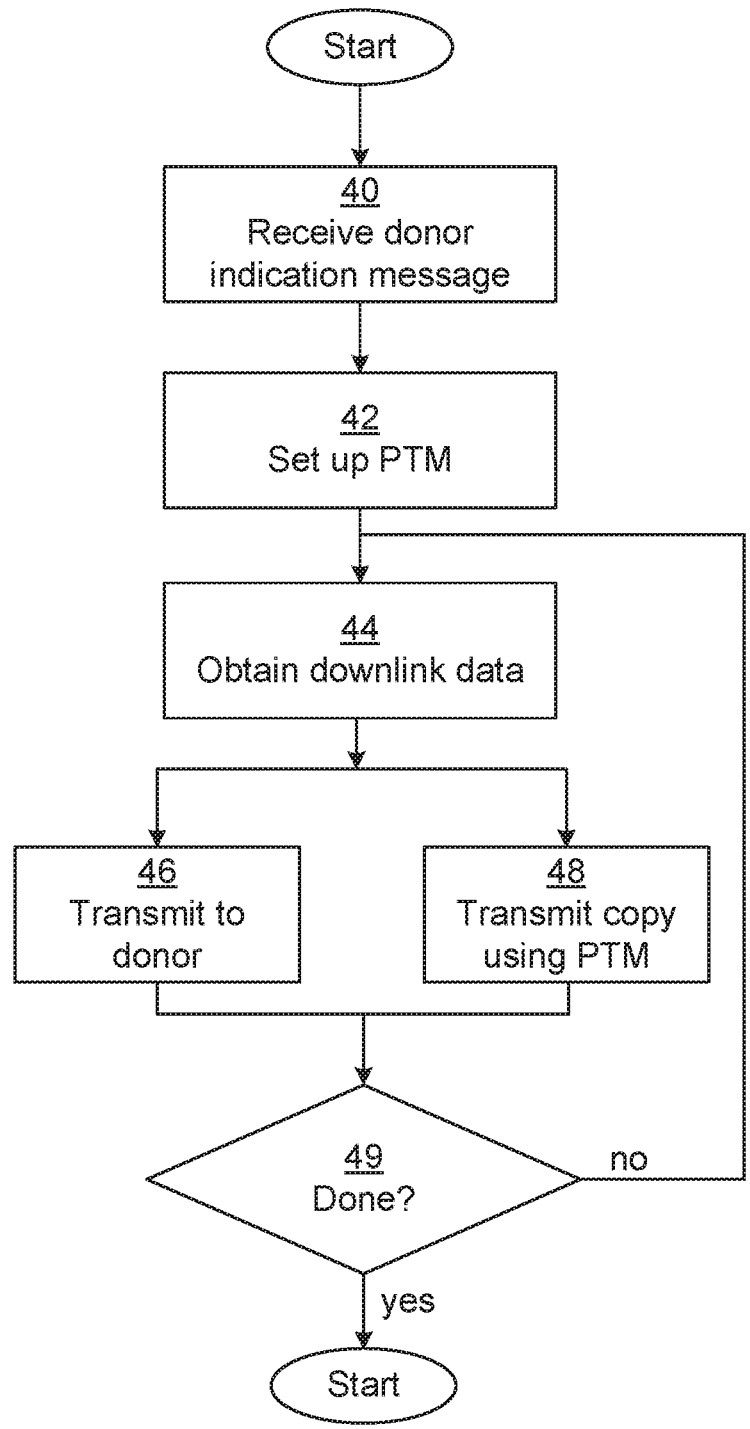
FIG. 4 is a flow chart illustrating embodiments of methods for enabling transmission of streaming content in a point to multipoint delivery, performed in a radio network node.

FIG. 4 is a flow chart illustrating embodiments of methods for enabling transmission of streaming content in a point to multipoint delivery, performed in a radio network node of a cellular network. The streaming content can be live content.

As explained above, the multipoint delivery can e.g. be based on Single Cell Point to Multipoint, SC-PTM as defined by 3GPP. By using SC-PTM, there is no requirement for the network operator to co-operate with the content provider, e.g. to setup a single frequency network and guaranteed bitrate bearer. In other words, the transport can be made transparent to the network operator in that the wireless devices communicates with the application servers of the content provider to allow the multipoint delivery to be set up.

In a receive donor indication step 40, a donor indication message is received from a wireless device. The donor indication message is transmitted from the wireless device in response to the wireless device receiving a donor command from an application server. The donor indication message indicates that the wireless device requests to be a donor device, after having been appointed by the application server, and can be received over a RLC (Radio Link Control) layer.

In a set up PTM step 42, a point to multipoint delivery session is set up as explained above with reference to FIG. 2.

In an obtain downlink data step 44, downlink data of streaming content destined for the donor device in a unicast delivery is obtained. This can comprise obtaining the downlink data as UDP packets.

In a transmit to donor step 46, the downlink data is transmitted in a unicast delivery to the donor device.

In a transmit copy using PTM step 48, a copy of the downlink data is transmitted using the point to multipoint session, such that the downlink data can be received by a plurality of wireless devices being recipient devices.

When the downlink data is in the form of UDP packets, the copy of the downlink data can be the UDP packets, i.e. unaltered. The recipient device would then replace the IP header with a multicast header to allow proper processing of the UDP packet.

Alternatively, the destination address in a header of each IP (Internet Protocol) packet containing a UDP packet is modified prior to transmitting the downlink data. In one embodiment, this implies that the radio node applies a multicast IP address for each UDP packet.

The unicast delivery and the multipoint delivery can be sent in the same radio cell.

In a conditional done step 49, the radio network node determines if the method can continue, i.e. if there is more data expected in the unicast session and the donor device is still available. If this is the case, the method is not done and returns to the obtain downlink data step 44. Otherwise, the method ends. Alternatively, the donor device is not available anymore (e.g. due to moving outside the cell), at which point a new donor could be appointed and the method restarts.

Figure 5A:
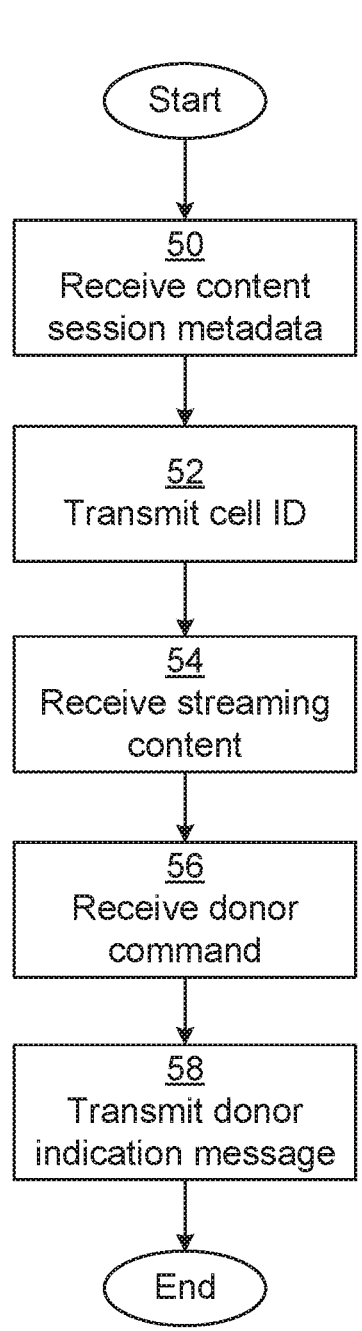
FIGS. 5A-B are flow charts illustrating embodiments of methods for enabling transmission of streaming content in a point to multipoint delivery, performed in a wireless device.
Figure 5B:
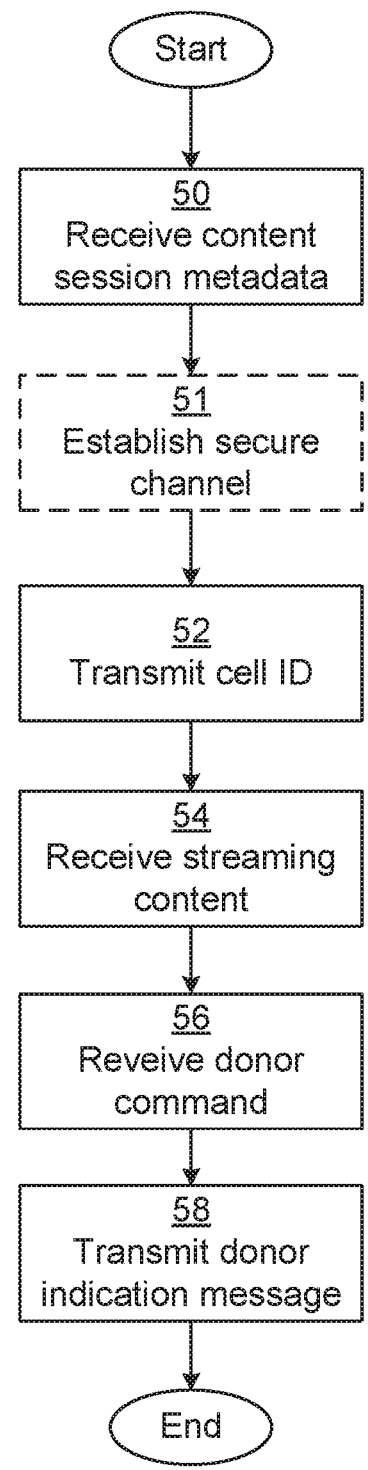

FIGS. 5A-B are flow charts illustrating embodiments of methods for enabling transmission of streaming content in a point to multipoint delivery, performed in a wireless device.

In a receive content session data step 50, content session metadata is received from an application server associated with a content server.

In a transmit cell ID step 52, a message is transmitted to an application server associated with the content provider. The message comprises an identifier of a current cell of the wireless device.

In a receive streaming content step 54, streaming content is received from the content server over unicast.

In a receive donor command step 56, a donor command is received from the application server. The donor command requests the wireless device to be a donor device, such that the streaming content should be a source for streaming content for other wireless devices.

In a transmit donor indication message step 58, a donor indication message is transmitted to a radio network node to request to be a donor device.

Looking now to FIG. 5B, only new or modified steps compared to the steps of FIG. 5A will be described.

In an optional establish secure channel step 51, a secure channel is established with the application server. When this step is performed, the receive streaming content step 54 comprises receiving the streaming content over the secure channel.

FIGS. 6A-B are flow charts illustrating embodiments of methods for enabling transmission of streaming content in a point to multipoint delivery, performed in an application server.

In a transmit content session metadata step 60, content session metadata is transmitted to a plurality of wireless devices.

In a trigger streaming step 62, streaming of content from the content server over unicast to each one of the plurality of wireless devices is triggered.

In a receive cell IDs step 64, a message is received from each one of the plurality of wireless devices. The message comprises an identifier of a current cell of the respective wireless devices.

In a determine donor device step 66, one of the plurality of wireless devices is determined to be a donor device. This allows the streaming content for the donor device to be a source for streaming content for the at least one other wireless device. The donor device is in a cell where there is at least one other wireless device. This determination is optionally based on predictions (e.g. based on machine learning or cubic splines) of the number of wireless devices are expected to request the request content in the cell in question.

Optionally, this comprises determining a wireless device which is preconfigured to be a donor device, to be the donor device. This allows the content provider to set up one or more dedicated devices to act as donor devices in locations where embodiments presented herein are especially applicable, such as in locations where a lot of people are expected, e.g. in train stations, airports, shopping centres, etc. The dedicated device can be a mains powered wireless device to prevent any battery of the dedicated device from running out.

In this way, the content provider seeds the introduction of PTM transport in a cell or cells through their dedicated device; moreover, the content provider may use and operate such a device as part of an agile control and production platform in that they may control from that device content downlink flow to other recipient devices over SC-PTM. Such a procedure might be used by an agile media company in an unscheduled live broadcast event e.g. an unplanned exciting event that originates from social media in a short space of time, and where the media company has a drone camera and multiple camera angles under their control allowing them (through their dedicated device) to control the broadcast in such a way the end users receiving the content will enjoy improved quality of experience (QoE) over an efficient PTM radio transport, even though there may be many end users being served in a cell or single frequency network.

In a transmit donor command step 68, a donor command is transmitted to the donor device. The donor command requests the wireless device to be the donor device and can be transmitted over the unicast connection to the wireless device to be the donor device.

Looking now to FIG. 6B, only new or modified steps compared to the steps of FIG. 6A will be described.

In an optional establish secure channel step 61, a secure channel is established with each one of the plurality of wireless devices, yielding a respective session key. For instance, DTLS can be applied for this.

In an optional transmit donor session key step 69, the session key associated with the donor device is transmitted to each one of the at least one other wireless device using their respective secure channel. When this step is performed, the trigger streaming step 62 comprises providing the session keys to the content server such that the streaming of content occurs using the respective session key.

The application server may also track point to multipoint reception by the reception devices, e.g. in communication with the app. This can be used by the application server to predict future consumption of the content.

Using the methods herein, the content provider can switch from unicast to multicast in a very efficient way. In the prior art, the content provider would need to configure the network to publish the content before it could be delivered using the point to multipoint delivery, which is made unnecessary with these embodiments.

Figure 7:
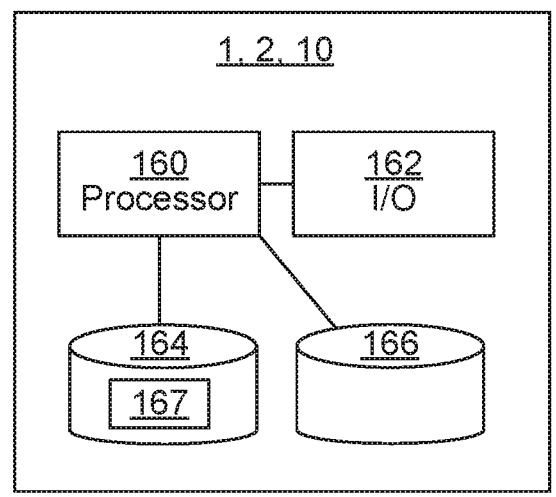
FIG. 7 is a schematic diagram illustrating components of the radio network node, the wireless device and the application server of FIG. 1, here represented by a single device.

FIG. 7 is a schematic diagram illustrating components of the radio network node 1, the wireless device 2 and the application server 10 of FIG. 1, here represented by a single device 1, 2, 10. A processor 160 is provided using any combination of one or more of a suitable central processing unit (CPU), multiprocessor, microcontroller, digital signal processor (DSP), application specific integrated circuit etc., capable of executing software instructions 167 stored in a memory 164, which can thus be a computer program product. The processor 160 can be configured to execute the method described with reference to FIG. 4, FIGS. 5A-B, and FIGS. 6A-B above.

The memory 164 can be any combination of read and write memory (RAM) and read only memory (ROM). The memory 164 also comprises persistent storage, which, for example, can be any single one or combination of magnetic memory, optical memory, solid state memory or even remotely mounted memory.

A data memory 166 is also provided for reading and/or storing data during execution of software instructions in the processor 160. The data memory 166 can be any combination of read and write memory (RAM) and read only memory (ROM).

The device 1, 2, 10 further comprises an I/O interface 162 for communicating with other external entities. Optionally, the I/O interface 162 also includes a user interface.

Other components of the device 1, 2, 10 are omitted in order not to obscure the concepts presented herein.

Figure 8:
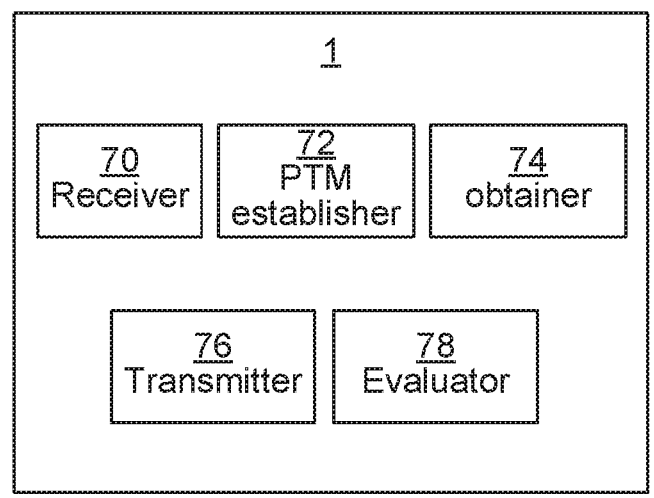
FIG. 8 is a schematic diagram showing functional modules of the radio network node of FIG. 1 according to one embodiment.

FIG. 8 is a schematic diagram showing functional modules of the radio network node 1 of FIG. 1 according to one embodiment. The modules are implemented using software instructions such as a computer program executing in the radio network node 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 4.

A receiver 70 corresponds to step 40. A PTM establisher 72 corresponds to step 42. An obtainer 74 corresponds to step 44. A transmitter 76 corresponds to steps 46 and 48. An evaluator 78 corresponds to step corresponds to step 49.

Figure 9:
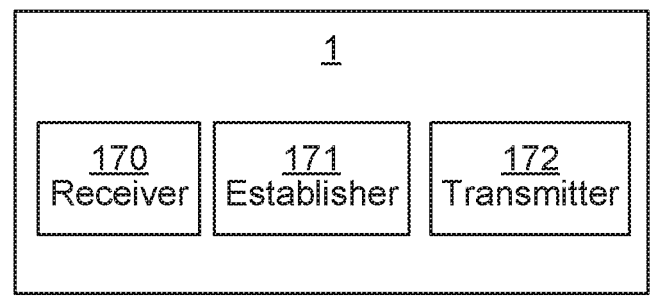
FIG. 9 is a schematic diagram showing functional modules of the wireless device of FIG. 1 according to one embodiment.

FIG. 9 is a schematic diagram showing functional modules of the wireless device 2 of FIG. 1 according to one embodiment. The modules are implemented using software instructions such as a computer program executing in the wireless device 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A and 5B.

A receiver 170 corresponds to steps 50, 54 and 56. An establisher 171 corresponds to step 51. A transmitter 172 corresponds to steps 52 and 58.

Figure 10:
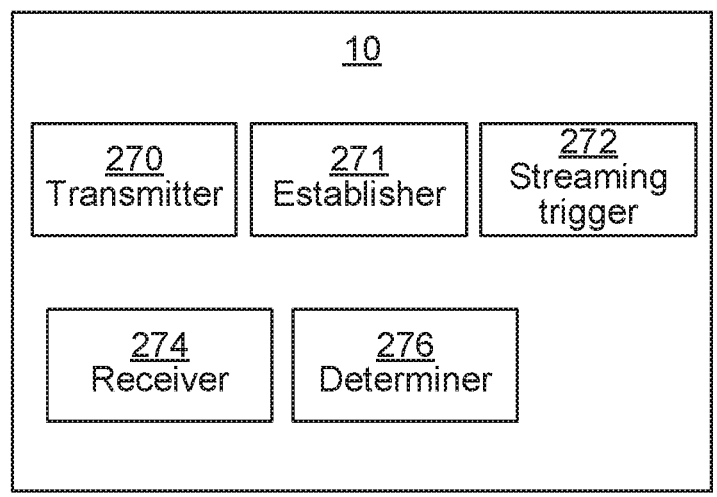
FIG. 10 is a schematic diagram showing functional modules of the application server of FIG. 1 according to one embodiment.

FIG. 10 is a schematic diagram showing functional modules of the application server of FIG. 1 according to one embodiment. The modules are implemented using software instructions such as a computer program executing in the application server. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A and 6B.

A transmitter 270 corresponds to steps 60, 68 and 69. An establisher 271 corresponds to step 61. A streaming trigger 272 corresponds to step 62. A receiver 274 corresponds to step 64. A determiner 275 corresponds to step 66.

Figure 11:
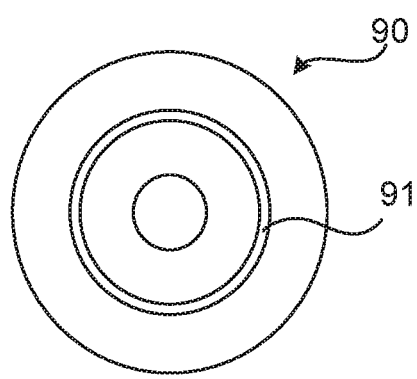
FIG. 11 shows one example of a computer program product comprising computer readable means.

FIG. 11 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 164 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for enabling transmission of streaming content in a point to multipoint delivery, the method being performed in a radio network node of a cellular network, the method comprising the steps of:
   receiving a donor indication message from a wireless device in response to the wireless device receiving a donor command from an application server, the donor indication message indicating that the wireless device requests to be a donor device;
   setting up a point to multipoint delivery session;
   obtaining downlink data of streaming content destined for the donor device in a unicast delivery;
   transmitting the downlink data in a unicast delivery to the donor device; and
   transmitting a copy of the downlink data using the point to multipoint session, such that the downlink data can be received by a plurality of wireless devices being recipient devices.

2. The method according to claim 1, wherein the multipoint delivery is based on Single Cell Point to Multipoint, SC-PTM.

3. The method according to claim 1, wherein the unicast delivery and the multipoint delivery are sent in the same radio cell.

4. The method according to claim 1, wherein the step of obtaining the downlink data comprises obtaining the downlink data as User Datagram Protocol, UDP, packets and the step of transmitting a copy of the downlink data comprises transmitting the downlink data comprising the UDP packets.

5. The method according to claim 1, wherein the step of obtaining the downlink data comprises obtaining the downlink data as User Datagram Protocol, UDP, packets and the step of transmitting a copy of the downlink data comprises modifying the destination address in a header of each Internet Protocol, IP, packet containing a UDP packet, prior to transmitting the downlink data.

6. A method for enabling transmission of streaming content in a point to multipoint delivery, the method being performed in a wireless device of a cellular network also comprising a radio network node, the method comprising the steps of:
receiving content session metadata from an application server associated with a content server;
transmitting a message to an application server associated with the content provider, the message comprising an identifier of a current cell of the wireless device;
receiving streaming content from the content server over unicast;
receiving a donor command from the application server, the donor command requesting the wireless device to be a donor device, such that the streaming content should be a source for streaming content for other wireless devices; and
transmitting a donor indication message to a radio network node to request to be a donor device.

7. The method according to claim 6, further comprising the step of:
establishing a secure channel with the application server; and wherein the step of receiving streaming content comprises receiving the streaming content over the secure channel.

8. A computer program for enabling transmission of streaming content in a point to multipoint delivery, the computer program comprising computer program code which, when run on a wireless device of a cellular network also comprising a radio network node causes the wireless device to:
receive content session metadata from an application server associated with a content server;
transmit a message to an application server associated with the content provider, the message comprising an identifier of a current cell of the wireless device;
receive streaming content from the content server over unicast;
receive a donor command from the application server, the donor command requesting the wireless device to be a donor device, such that the streaming content should be a source for streaming content for other wireless devices; and
transmit a donor indication message to a radio network node to request to be a donor device.

9. A method for enabling transmission of streaming content in a point to multipoint delivery, the method being performed in an application server associated with a content server, the method comprising the steps of:
transmitting content session metadata to a plurality of wireless devices;
triggering streaming of content from the content server over unicast to each one of the plurality of wireless devices;
receiving a message from each one of the plurality of wireless devices, the message comprising an identifier of a current cell of the respective wireless devices;
determining one of the plurality of wireless devices to be a donor device, such that the streaming content for the donor device should be a source for streaming content for the at least one other wireless device wherein the donor device is in a cell where there is at least one other wireless device; and
transmitting a donor command to the donor device, the donor command requesting the wireless device to be the donor device.

10. The method according to claim 9, wherein the step of determining of the plurality of wireless devices to be a donor device comprises determining a wireless device which is preconfigured to be a donor device, to be the donor device.

11. The method according to claim 10, further comprising the step of:
establishing a secure channel with each one of the plurality of wireless devices, yielding a respective session key;
wherein the step of triggering streaming of content comprises providing the session keys to the content server such that the streaming of content occurs using the respective session key;
the method further comprising the step of:
transmitting the session key associated with the donor device to each one of the at least one other wireless device using the respective secure channel.

12. The method according to claim 9, wherein the step of determining one of the plurality of wireless devices to be a donor device comprises determining a wireless device to be a donor device based on predicted movement of the wireless device.

* * * * *